United States Patent
Mann

Patent Number: 5,306,113
Date of Patent: Apr. 26, 1994

[54] FOLD OUT RAMP SYSTEM

[76] Inventor: Fred W. Mann, Box 444, Waterville, Kans. 66548

[21] Appl. No.: 974,901

[22] Filed: Nov. 10, 1992

Related U.S. Application Data

[63] Continuation-in-part of Ser. No. 756,808, Sep. 9, 1991, abandoned.

[51] Int. Cl.5 ............................................ B65G 69/28
[52] U.S. Cl. ...................................... 414/537; 414/480
[58] Field of Search ................. 414/24.5, 480, 537, 414/538, 571; 14/71.1

[56] References Cited

U.S. PATENT DOCUMENTS

| | | | |
|---|---|---|---|
| 2,756,882 | 10/1954 | Albertson | 414/538 |
| 2,900,094 | 8/1959 | Ferguson | 414/537 |
| 3,795,333 | 3/1974 | Tebben | 414/537 |
| 3,834,565 | 9/1974 | Goodman et al. | 414/537 |
| 4,088,235 | 5/1978 | Thacker | 414/537 |
| 4,144,979 | 3/1979 | Leach et al. | 414/537 |
| 4,305,694 | 12/1981 | Chan | 414/537 X |
| 4,380,415 | 4/1983 | Higginson et al. | 414/537 |
| 4,475,761 | 10/1984 | Milroy et al. | 414/537 X |
| 4,647,270 | 3/1987 | Maloney | 414/537 |
| 4,657,233 | 4/1987 | Vroom | 414/537 X |
| 4,729,712 | 3/1988 | Corley, Jr. | 414/537 X |
| 4,792,274 | 12/1988 | Cockram | 414/537 |
| 4,850,788 | 7/1989 | Dickson | 414/537 |
| 4,979,867 | 12/1990 | Best | 414/537 |
| 5,145,310 | 9/1992 | Calzone | 414/537 |

FOREIGN PATENT DOCUMENTS 207745 8/1988 Japan ............................. 414/537

*Primary Examiner*—Michael S. Huppert
*Assistant Examiner*—James Keenan
*Attorney, Agent, or Firm*—Litman, McMahon & Brown

[57] ABSTRACT

An improved fold out ramp system apparatus for a flat bed trailer includes a tapered tail end extending rearwardly from the trailer; at least one transition ramp having a front end pivotally secured to the trailer in close proximity to the juncture between the tapered tail end and the trailer; a clamping mechanism for selectively clamping the transition ramp in either an elevated configuration or a sloping configuration; and a tail ramp pivotally secured to a rear end of each of the transition ramps in end-to-end relationship. A brace pivotally connected to the tapered tail end is releasably connectable to the tail ramp to form a blocking configuration. A leaf spring having one end fixedly secured to the trailer is adapted to urge the transition ramp rear end upwardly to counter the weight thereof. Similarly, a torsional spring is adapted to urge the tail ramp free end upwardly relative to the transition ramp in order to counter the weight of the tail ramp. In a second embodiment of the invention, a coil spring replaces the leaf spring to urge the transition ramp upwardly to counter the weight thereof, and a pair of rotatable rods with handles are provided to lock the transition ramp in the elevated position and to lock the tail ramp in a travel position.

21 Claims, 4 Drawing Sheets

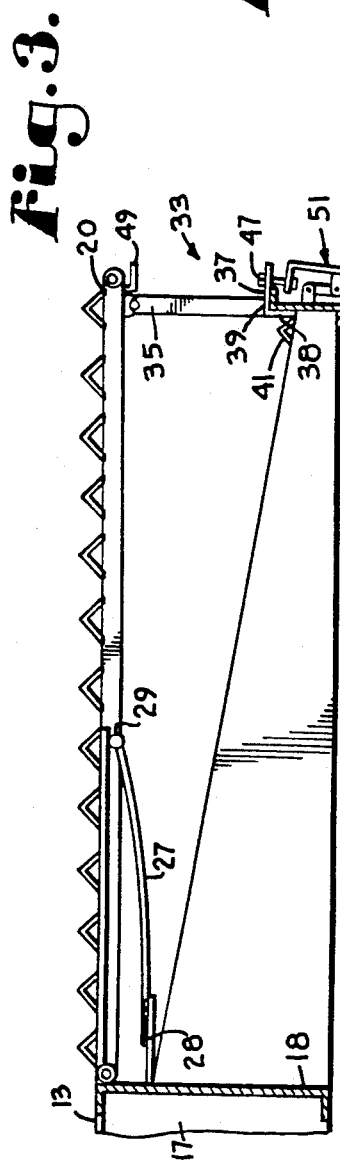
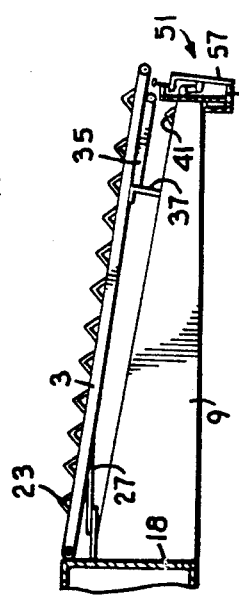
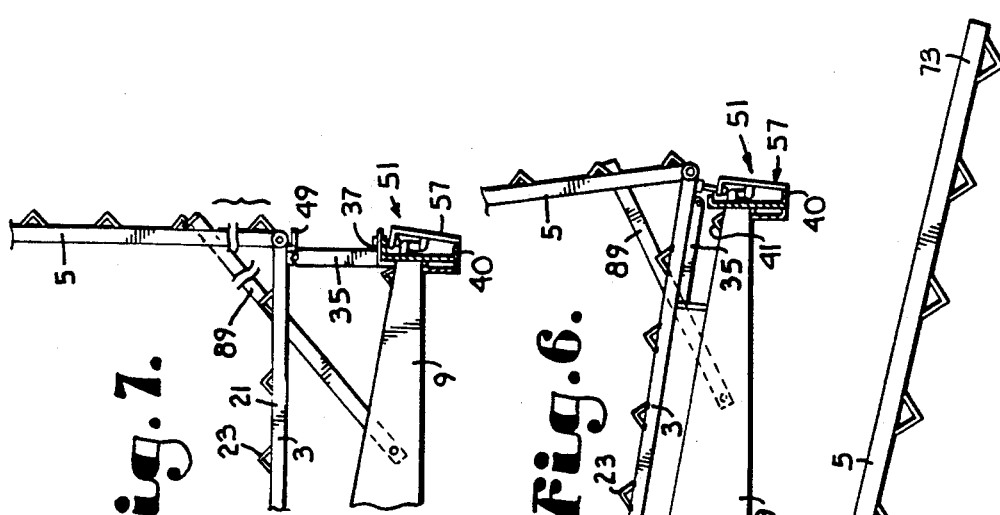
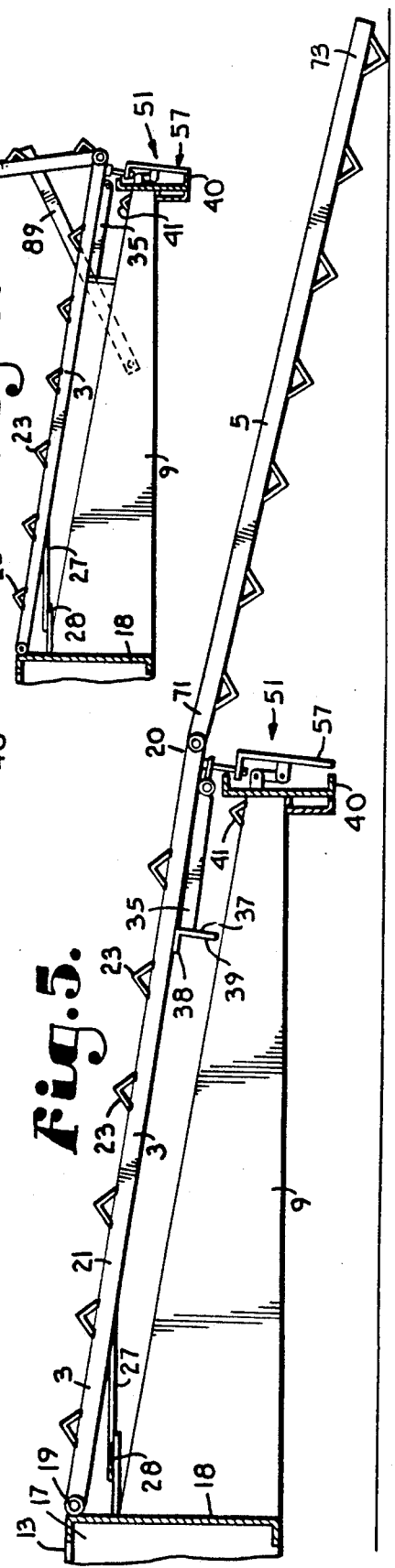

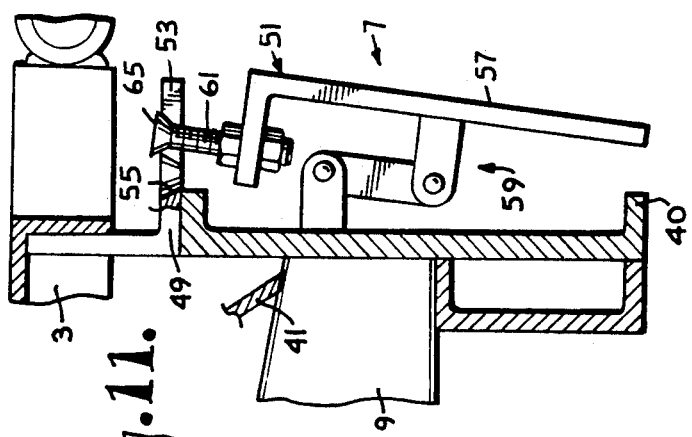
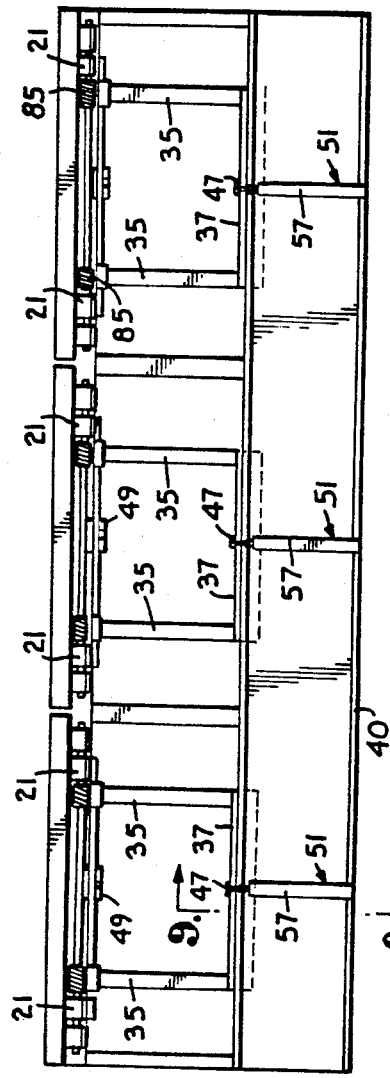
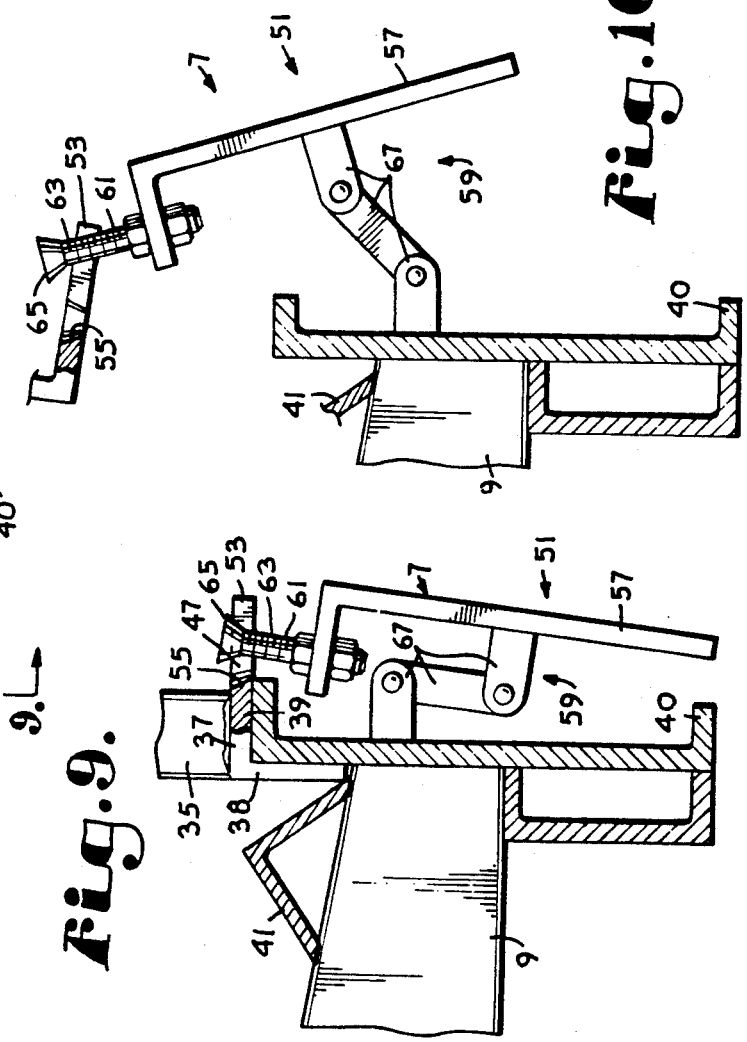

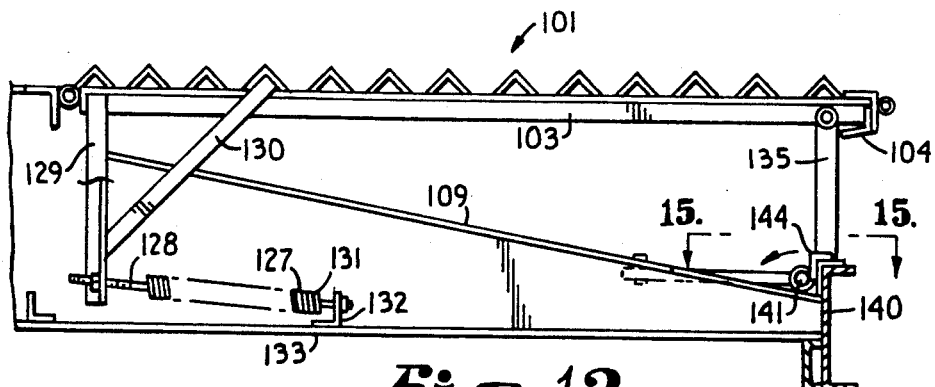
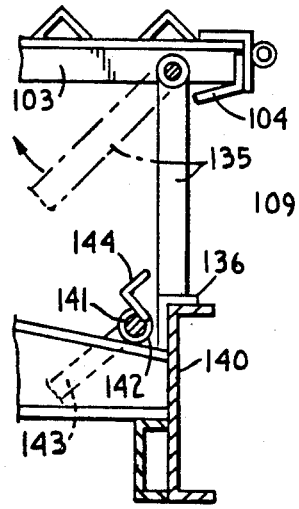
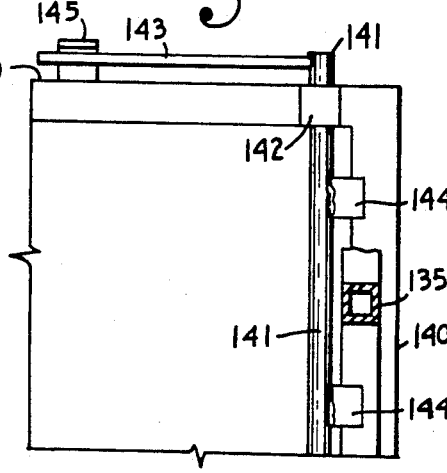
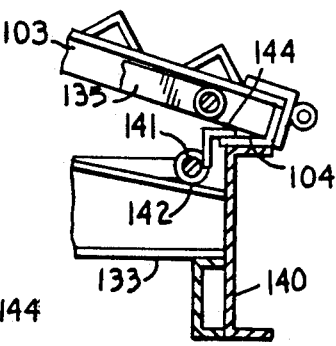
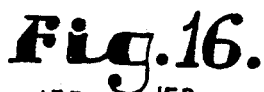
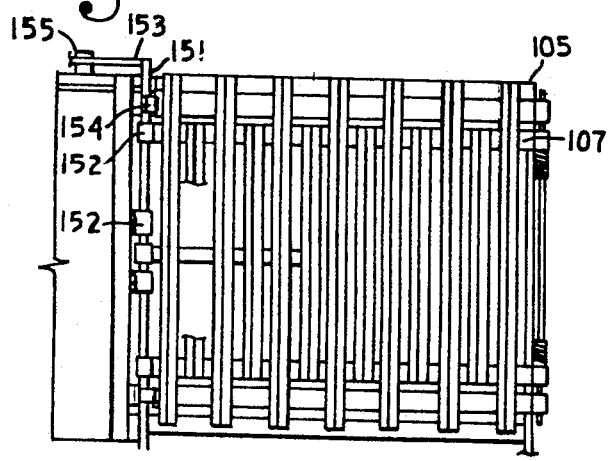
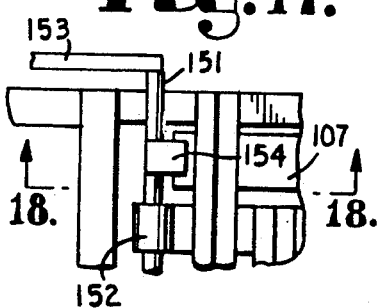
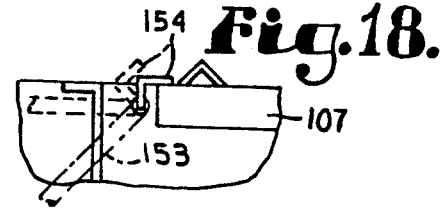

FOLD OUT RAMP SYSTEM

CROSS REFERENCE TO RELATED APPLICATIONS

This application is a continuation-in-part of application Ser. No. 07/756,808, entitled FOLD OUT RAMP SYSTEM, filed Sep. 9, 1991, and now abandoned.

BACKGROUND OF THE INVENTION

The present invention relates generally to a ramp system apparatus for loading materials and equipment and, more particularly, to such a ramp system apparatus on a trailer which folds out into a sloping configuration.

Trailers have long been used for transporting various loads, including equipment, large round hay bales, and other materials. For many applications, it is preferable that the trailer bed comprises a large unhindered flat area. This generally requires that the bed be positioned above the wheels such that fenders and wheel cowlings do not protrude above and interfere with the upper surface of the trailer bed. For trailers having loading ramps, the higher elevation of such an unhindered flat bed area generally requires that equipment and materials being displaced along those ramps experience radical shifts of their center of gravity during the loading process. This situation leads not only to substantially reduced stability during the loading process but also leads to a requirement of substantially greater thrust while displacing the load onto the trailer.

Another complication that sometimes arises with ramps occurs for those trailers wherein the ramps are separate accessories rather than remaining an integral part of the trailer apparatus. As a result, such ramps can be inadvertently misplaced and not be available when needed. Also, such ramps can sometimes bounce loose and be lost along a transportation route.

One common use of flat bed trailers is for transportation of large round hay bales. Various types of riggings, many haphazard, have been employed for securing such bales to the underlying trailer.

What is needed is a ramp system which is an integral part of a trailer whereby the ramps cannot bounce loose and which provides a loading arrangement causing less abrupt shifting of the centers of gravity of the equipment and materials being loaded onto the trailer. A simple, releasable mechanism is also needed for maintaining large round bales on a flat bed trailer while being transported.

SUMMARY OF THE INVENTION

An improved fold out ramp system apparatus for a flat bed trailer or other vehicular or loading platform arrangement is provided for loading equipment, materials, or the like, thereon. The apparatus includes a tapered tail end fixedly secured and extending rearwardly from the supporting structure of the loading platform. At least one transition ramp, which has a front end pivotally secured to the rear end of the loading platform, has cross rails for supporting loads thereon. A stanchion mechanism, pivotally connected to the rear end of the transition ramp, can either be placed in a generally upright spacing whereby the transition ramp is in an elevated configuration or can be rotated alongside the transition ramp such that the transition ramp can be lowered to a sloping configuration whereat the transition ramp bears against the tapered tail end. A clamping mechanism in conjunction with a first bracket provides the ability to clamp the transition ramp in the elevated configuration or in conjunction with a second bracket to clamp the transition ramp in the sloping configuration. A leaf-type spring has one end fixedly secured to the loading platform such that the other end of the spring urges the transition ramp upwardly to counter the weight thereof when displacing the transition ramp from the sloping configuration to the elevated configuration.

At least one tail ramp has a front end which is pivotally connected to the rear end of the transition ramp. When the tail ramp is fully folded out rearwardly such that the transition ramp in end-to-end relationship with the tail ramp spans the vertical distance between the flat bed and the underlying surface, the apparatus forms a loading configuration. When the tail ramp is not being used for loading and unloading purposes, the tail ramp may be either placed alongside the transition ramp in a storage configuration or it can be spaced generally perpendicular to the transition ramp in the blocking configuration by a releasable brace, such as when hauling large round bales whereby the tail ramps serve to block the bales from rolling off rearwardly.

In essence, the fold out ramp system apparatus provides basically five different configurations:

(a) transition ramp in elevated configuration and tail ramp in storage configuration (configuration (a));

(b) transition ramp in sloping configuration and tail ramp in storage configuration (configuration (b));

(c) transition ramp and tail ramp in loading configuration (configuration (c));

(d) transition ramp in sloping configuration and tail ramp in blocking configuration (configuration (d)); and (e) transition ramp in elevated configuration and tail ramp in blocking configuration (configuration (e)).

In a second embodiment of the invention, a coil spring replaces the leaf spring to urge the transition ramp upwardly to counter the weight thereof when transitioning from a sloping to an elevated configuration. In addition, a pair of rotatable locking rods are provided, one extending across the rear end of the transition ramp and one extending across the front end of the transition ramp. A separate handle is attached to each of the rods to selectively rotate them about a longitudinal axis, and a plurality of locking tabs are welded to each of the rods. In the case of the rear rod, when the transition ramp is placed in the elevated configuration, the rod is rotated counterclockwise, causing the locking tabs to mesh with matching locking tabs on the supporting stanchion to lock the transition ramp in the elevated configuration. The front rod is similarly rotated when the tail ramp is folded over the transition ramp and placed in the travel configuration. In this case, the locking tabs mesh with support members on the tail ramp to keep it from bouncing during travel. Handle retainers are provided for both handles, with the keepers positioned to hold the handles, and therefore the locking rods, in a locked position.

OBJECTS AND ADVANTAGES OF THE INVENTION

Therefore, the principle objects and advantages of the present invention include: providing a ramp system apparatus which is an integral part of a trailer; providing such a ramp system which causes reduced shifting of the centers of gravity of loads during a loading process; providing such a system without substantially extending the length of the trailer; providing such a ramp system which includes reliable locking rods and handles for securely latching a transition ramp in an elevated position and a tail ramp in a travel position; providing such a system having a simple, releasable mechanism for maintaining a load such as large round bales on the trailer; and to generally provide such a ramp system apparatus that is relatively easy to use, inexpensive to manufacture and particularly well adapted to the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a further enlarged side elevational view of the fold out ramp system apparatus, showing the transition ramp in an elevated configuration and the tail ramp in a storage configuration (configuration (a)).

FIG. 4 is an enlarged side elevational view of the fold out ramp system apparatus showing the transition ramp in a relaxed configuration and the tail ramp in the storage configuration (configuration (b)).

FIG. 5 is a further enlarged, side elevational view of the fold out ramp system apparatus in a loading configuration (configuration (c)).

FIG. 6 is an enlarged, cross-sectional view of the fold out ramp system apparatus, with the transition ramp in a relaxed configuration and the tail ramp in a blocking configuration (configuration (d)).

FIG. 7 is an enlarged, cross-sectional view of the fold out ramp system apparatus, showing the transition ramp in the elevated configuration and the tail ramp in the blocking configuration (configuration (e)).

FIG. 8 is an enlarged and rear elevational view of the fold out ramp system apparatus, showing three latching mechanisms locking the transition ramps in the elevated configuration.

FIG. 9 is a further enlarged side elevational of the latching mechanism of the fold out ramp system apparatus, taken generally along line 9—9 of FIG. 8, showing the latching mechanism in a locked elevated configuration.

FIG. 10 is a further enlarged and fragmentary, side elevational view of the latching mechanism of the fold out ramp system apparatus, similar to that of FIG. 9, but showing the latching mechanism in an unlocked configuration.

FIG. 11 is a further enlarged and fragmentary, side elevational view of the fold out ramp system apparatus, showing the latching mechanism in a locked configuration, similar to that of FIG. 9, but with the transition ramp in the sloped configuration, according to the present invention.

FIG. 12 is an enlarged and fragmentary side elevational view of a alternative embodiment of the fold out ramp system, showing a coil biasing spring and a pair of rotating locking bars.

FIG. 13 is a further enlarged and fragmentary side elevational view of the fold out ramp system, showing the stanchion in solid lines holding the transition ramp in an elevated configuration and in phantom lines being pivoted to a position in which the transition ramp is placed in a lowered configuration.

FIG. 14 is a further enlarged and fragmentary side elevational view of the fold out ramp system, showing tabs on a first one of the locking rods securing the transition ramp in a lowered configuration.

FIG. 15 is an enlarged and fragmentary cross-sectional view of the fold out ramp system, taken along line 15—15 of FIG. 12, showing the positions of the locking tabs on the first locking rod and illustrating a first locking rod handle in a stowed position.

FIG. 16 is an enlarged and fragmentary top plan view of the fold out ramp system, showing a second locking rod and handle securing the loading ramp in a travel configuration.

FIG. 17 is a further enlarged and fragmentary top plan view of the fold out ramp system, showing a locking tab on the second locking rod securing a corresponding support member of the loading ramp, thus locking the loading ramp in the travel configuration.

FIG. 18 is an enlarged and fragmentary cross-sectional view of the fold out ramp system, taken along line 18—18 of FIG. 17, showing the locking tabs on the second locking rod in solid lines in a locked position, and in phantom lines being rotated to a non-locked position.

DETAILED DESCRIPTION OF THE INVENTION

Figure 1:
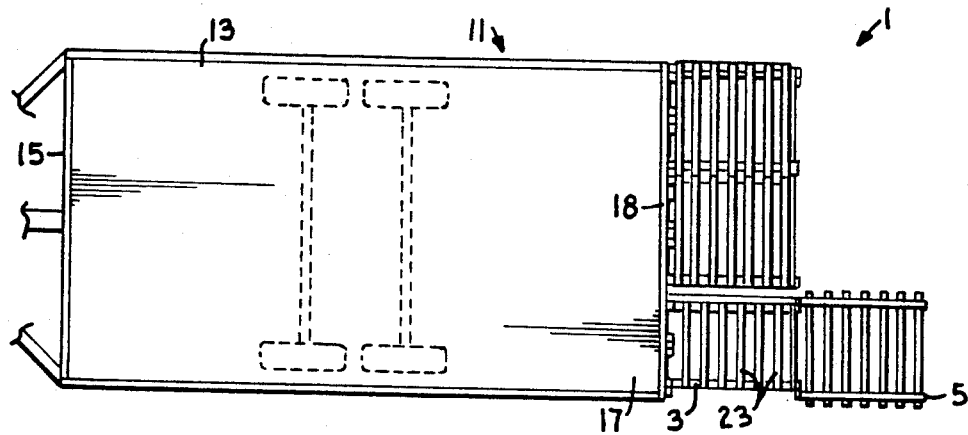
FIG. 1 is a top plan view of a flat bed trailer with a fold out ramp system apparatus having three transition ramps and three tail ramps, according to the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a fold out ramp system apparatus in accordance with the present invention, as shown in FIGS. 1-11. The apparatus 1 includes transition ramping means, such a plurality of transition ramps 3 spaced in generally side-by-side relationship, tail ramping means, such as a plurality of tail ramps 5 spaced in generally side-by-side relationship, clamping means 7, and a tapered tail end 9. The following is described in terms of the apparatus 1 being used in conjunction with a trailer 11 having a flat bed 13, a bed front end 15 and a bed rear end 17 but it is foreseen that the apparatus 1 can be used in conjunction with other loading platforms, both mobile and stationary.

The tapered tail end 9 is fixedly secured to a frame 18 which may be either a part of the trailer 11 or separate therefrom and installed on the bed rear end 17 as a kit by methods commonly known in the art.

Figure 2:
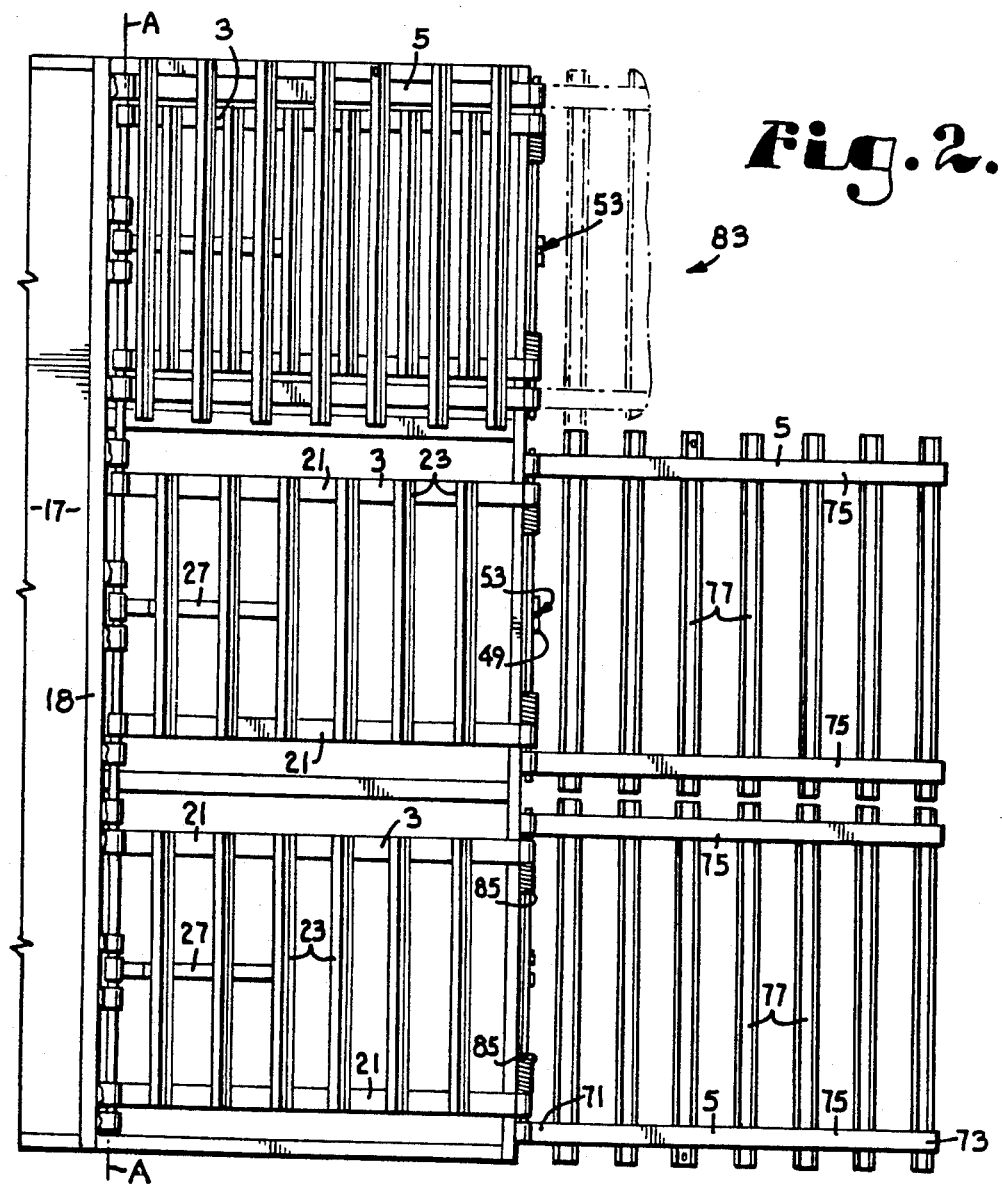
FIG. 2 is an enlarged top plan view of the fold out ramp system apparatus, showing two of the tail ramps in a loading configuration.

Each of the transition ramps 3 has a transition ramp front end 19, a transition ramp rear end 20, and includes a pair of generally parallel, spaced apart side rails 21, each of which is pivotally connected to the frame 18 about a generally horizontally oriented axis AA as shown in FIG. 2, such that the ramps 3 are positioned above the tapered tail end 9. A plurality of generally parallel, spaced apart cross rails 23 are fixedly secured generally perpendicular to each pair of the side rails 21. The side rails 21 and the cross rails 23 are preferably constructed of steel angles or channels, or the like, which have sufficient ruggedness and durability to withstand loads as described herein.

First biasing means are provided, such as a leaf-type spring 27, at least one for each of the transition ramps 3, wherein each has a proximal end 28 fixedly secured to the frame 18 and a distal end 29 bearing against an underside surface of the respective tail ramp 3 to counter the weight of the respective transition ramp 3.

Positioning means, such as a stanchion mechanism 33, one for each of the transition ramps 3, provides the ability to selectively space a respective one of the transition ramps 3 relative to the tapered tail end 9 therebelow. Each of the stanchion mechanisms 33 includes a pair of generally parallel spaced apart stanchion sides 35, each having one end pivotally secured to the respective transition ramp rear end 20 and the other end secured to a transversely oriented stanchion bar 37. The stanchion mechanisms 33 are pivoted such that the stanchion sides 35 gravitationally seek an upright orientation. The stanchion bar 37 is preferably construction of angular steel, or other suitable material, with a flange 38 extending generally axially and another flange 39 extending generally transversely to the stanchion sides 35, as shown in FIG. 9.

The stanchion sides 35 are dimensioned such that as the stanchion sides 35 are rotated into a generally vertical orientation, as shown in FIG. 3 and sometimes referred to herein as an elevated configuration, the flange 39 bears against a generally horizontal structural member 40 which is fixedly secured to the tapered tail end 9, upper extremities of the respective transition ramp 3 are generally coplanar with the flat bed 13. The stanchion mechanism 33 is adapted such that the stanchion bar 37 can be rotated toward and spaced alongside the respective transition ramp 3 such that the transition ramp 3 can be supported by the spring 27 and, subsequently, by employing the clamping means 7 as hereinafter described, spaced alongside the underlying tapered tail end 9, sometimes referred to herein as a sloping configuration. In the sloping configuration, the respective transition ramp 3 provides an inclined plane spanning a portion of the vertical distance between the flat bed 13 and the underlying surface or ground supporting the trailer 11.

A stop 41 is fixedly secured to the tapered tail end 9 along side the structural member 40 such that the flange 38 is spaced between the stop 41 and structural member 40 as the respective transition ramp 3 is in the elevated configuration. The structural member 40 preferably depends downwardly from the tapered end 9, as shown in FIG. 9.

The clamping means 7 includes first brackets 47, one formed and generally centrally spaced in each of the stanchion bars 37; second brackets 49, one generally centrally spaced and fixedly secured to each of the transition ramps 3, and latch mechanisms 51, one for each of the transition ramps 3. Each of the first brackets 47 and the second brackets 49 have a slot 53, which is preferably keyhole shaped with an enlarged detent 55. Each of the latch mechanisms 51 includes a handle 57, a locking mechanism 59, and a stud 61 with a shaft 63 and an enlarged knob 65. The stud 61 is dimensioned such that the shaft 63 is slidably insertable in the slot 53 and the knob 65 is dimensioned larger than the transverse dimensions of the detent 55. The locking mechanism 59 is adapted such that as the handle 57 is spaced as shown in FIG. 9, cooperating links 67 provide leverage to overcome the resiliency of the spring 27 and further provide an over-center camming arrangement whereby the handle 57 is effectively locked into the position shown.

The latch mechanism 51 is adapted such that as the latch mechanism 51 is used in conjunction with the first bracket 47, as shown in FIG. 9, the respective transition ramp 3 is effectively clamped in the elevated position. Similarly, the latch mechanism 51 is adapted such that as the latch mechanism 51 is used in conjunction with the second bracket 49, the respective transition ramp 3 is effectively clamped in the relaxed configuration.

Each of the tail ramps 5 has a tail ramp secured end 71, a tail ramp free end 73, and includes a pair of generally parallel, spaced apart side rails 75, each of which is pivotally connected to the respective transition ramp rear end 20.

A plurality of generally parallel, spaced apart cross rails 77 are fixedly secured generally perpendicular to each pair of the side rails 75. The side rails 75 and the cross rails 77 are preferably constructed of steel angles or channels, or the like, which have sufficient ruggedness and durability to withstand loads as described herein. The side rails 75 and the cross rails 77 are appropriately spaced such that as each of the tail ramps 5 is rotated into the position designated by the numeral 83 in FIG. 2 and sometimes referred to herein as a storage configuration, the side rails 75 straddle and are spaced alongside the side rails 21 with the cross rails 23 spaced between and generally coplanar with the cross rails 77.

Second biasing means, such as one or more torsional springs 85 for each of the tail ramps 5, bias the tail ramp free end 73 toward the respective transition ramp 3 to counter the weight of the tail ramp 5. As each of the tail ramps 5 is folded out rearwardly, as shown in FIG. 5, sometimes referred to herein as a loading configuration, the respective tail ramp 5 provides an inclined plane spanning the vertical distance between the respective transition ramp rear end 20 and the underlying surface supporting the trailer 11.

In an application of the present invention, the trailer 11 having the fold out ramp system apparatus 1 is generally stored with the transition ramps 3 clamped in the elevated configuration and the tail ramps 5 spaced in the storage configuration, configuration (a) as shown in FIG. 3. As the trailer 11 is being prepared for loading, each of the handles 57 is urged rearwardly in order to unlock the respective latch mechanisms 51 and the respective studs 61 are withdrawn from their respective slots 53. Each of the transition ramp rear ends 20 is then urged upwardly such that the respective stanchion bars 37 can clear the respective stops 41 and the stanchion bars 37 are manually rotated toward the trailer 11. The transition ramp rear ends 20 are then individually lowered, with the stanchion bars 37 sliding along the tapered tail end 9, until each of the transition ramps 3 bear against the tapered tail end 9 whereat the transition ramps 3 are in a relaxed configuration and the tail ramps 5 are in a storage configuration, configuration (b) as shown in FIG. 4. Preferably, the transition ramps 3 are then clamped in position with the clamping means 7.

The tail ramps 5 ar then folded out by rotating the tail ramp free ends 73 away from the respective transition ramps 3 until the tail ramp free ends abut against or are in close proximity to the underlying surface supporting the trailer 11. It is foreseen that, for some applications, less than all of the tail ramps 5, such as only the outer tail ramps 5 on a trailer 11 having three of the tail ramps 5, would be folded out as described.

By spanning the vertical distance between the flat bed 13 and the underlying surface with the transition ramps 3 in conjunction with the tail ramps 5 in end-to-end relationship, the shifts in the centers of gravity of equipment and materials being loaded on and unloaded from the trailer 11 is gradual, thereby reducing the risk of accidents occurring during the loading process. In addition, with the transition ramps 3 and the tail ramps 5 all interconnected with the frame 18 as described, the apparatus 1 provides a much more stable loading environment than is attainable with trailers which employ ramps not directly connected thereto. The fold out ramp system apparatus 1, as extended, is in a loading configuration, configuration (c) as shown in FIG. 5.

After loading equipment or materials onto the trailer 11, the tail ramp free ends 73 are manually urged upwardly. The springs 85 reduce the magnitude of effort required to so urge the tail ramps 5. If the trailer 11 is to be transported without a load remaining on the transition ramps 3 and with the transition ramps 3 in the elevated configuration, then the tail ramps 5 can be rotated into the storage configuration or, alternatively, can be spaced generally perpendicular to the transition ramps 3, sometimes referred to herein as a blocking configuration, configuration (e) as shown in FIG. 7. Braces 89, at least one for each of the tail ramps 5, have one end thereof pivotally secured to the tapered tail end 9 and the other end thereof releasably secured to the respective tail ramp 5 to selectively retain it in the blocking configuration. When desired, the trailer 11 can also be transported with the transition ramps 3 in the sloping configuration with the tail ramps 5 in the blocking configuration, configuration (d) as shown in FIG. 6, such as for hauling large round hay bales.

FIGS. 12-18 illustrate an alternative embodiment of the fold out ramp system, which will be described below. This system, designated generally as 101, is very similar in construction to the ramp system 1 and only the differing features will be described herein. A plurality of transition ramps 103 are positionable in both a sloping configuration and an elevated configuration, with the elevated configuration shown in FIG. 12 and the sloping configuration illustrated in FIG. 14. A plurality of tail ramps 105 are positionable in a travel configuration, a blocking configuration or a loading configuration, with the ramps 105 illustrated in the travel configuration in FIGS. 16-18.

Referring again to FIGS. 12-15, the transition ramps 103 include a like plurality of stanchions 135 pivotally attached thereto. In order to place the transition ramps 103 in the elevated configuration, the stanchions 135 are pivoted downward as the ramps 103 are raised, with a bottom angle member 136 of the stanchions 135 overlapping the topmost portion of a trailer bumper 140. Once the stanchions 135 are placed in this position, a first locking rod 141 is rotated within a plurality of welded sleeves 142 via a first handle 143. This places a plurality of locking tabs 144 on the rod 141 over corresponding ones of the angle members 136 of the stanchions 135, thus locking the transition ramps 103 in the elevated configuration. A handle retainer 145 is rigidly attached to one side of a trailer tapered tail end 109, and the handle 143, which is slightly biased away from the trailer tapered tail end 109, is forced inward against the bias and placed in the retainer 145 to hold the rod 141 in the locked state. When the transition ramps 103 are to be placed in the sloping configuration, the handle 143 is removed from the retainer 145 and rotated as shown in FIG. 13, thus releasing the stanchions 135 and allowing them to be pivoted upward, as shown in phantom lines in FIG. 13. Once the transition ramps 103 have been lowered to the sloping configuration, as shown in FIG. 14, the handle 143 is again rotated, causing the rod 141 to rotate the tabs 144 into a position in which they overlie corresponding mating locking angle members 104 on the ramps 103, thus locking the ramps 103 in the sloped configuration. Again, the handle 143 is placed in the retainer 145 to hold the rod 141 in the locked position.

FIG. 12 also illustrates a different biasing spring arrangement, with a coil spring 127 with one end 128 thereof attached to a vertically oriented support 129, which support 129 is, in turn, rigidly attached to one of the transition ramps 103. An angled brace 130, also attached to the transition ramp 103, adds strength to the connection. The opposite end 131 of the coil spring 127 is attached to a bracket 132, which is, in turn, attached to a horizontal structural member 133 of the trailer tapered tail end 109. The spring 127 urges the connected transition ramp 103 upward, thus at least partially counteracting the weight of the ramp 103 when it is raised from the sloping configuration into the elevated configuration.

Referring to FIGS. 16-18, a second locking rod 151 is illustrated at the pivot point between the transition ramp 141 and a main trailer body 117. The locking rod 151 is rotatable within a plurality of welded sleeves 152 and includes an attached handle 153 and a plurality of locking tabs 154. Each tab 154 is positioned to overlie a respective support member 107 of the loading ramp 105, when the handle is rotated to the position shown in FIGS. 16 and 17. The tabs 154 thus lock the loading ramp 105 in the travel configuration, keeping the ramps 105 from bouncing and chattering as the system 101 is moved. A handle retainer 155 is rigidly attached to one side of a trailer body 117, and the handle 153, which is slightly biased away from the trailer body 117, is forced inward against the bias and placed in the retainer 155 to hold the rod 151 in the locked state. When the loading ramps 103 are to placed in the loading configuration, the handle 153 is removed from the retainer 155 and rotated, as shown in phantom lines in FIG. 18, thus releasing the stanchions support members 107 and allowing the loading ramps 105 to be pivoted backward.

The rods 141 and 151, which may be constructed from 5/8$\frac{3}{8}$ round cold rolled steel, for example, are designed to be somewhat flexible. This flexibility provides a spring effect to assist in locking the handles 143 and 153 in the retainers 145 and 155, respectively. The flexibility also provides minimal resistance from the rod 151 when the transition ramps 103 are pivoted between the sloping and the elevated configurations.

It is to be understood that the fold out ramp system apparatuses 1 and 101 may comprise a variety of different configurations in addition to that described herein, such as a single transition ramp 3 or 103 spanning substantially across the entire width of the trailer 11 and a single tail ramp 5 or 105 pivotally secured thereto in end-to-end relationship, or a pair of spaced apart transition ramps 3 or 103 (no center ramp), each having a different tail ramp 5 or 105 pivotally connected in end-to-end relationship as herein described.

It is to be understood that while certain forms of the present invention have been illustrated and described herein, it is not to be limited to the specific forms or arrangement of parts described and shown.

What is claimed and desired to be secured by letters patent is as follows:

1. In a vehicle having an elevated flat bed for transporting a load wherein the bed has a bed front end and a bed rear end, the improvement comprising:
   (a) transition ramping means for ramping to said flat bed, said transition ramping means having a transition ramp front end, which is pivotally connected to the bed rear end, and a transition ramp rear end;
   (b) tail ramping means for ramping to said transition ramp rear end for loading and unloading the vehicle, said tail ramping means having a tail ramp secured end, which is pivotally connected to said transition ramp rear end, and tail ramp free end;
   (c) transition ramp supporting means for supporting said transition ramping means in an elevated position extending rearwardly from said bed rear end;
   (d) a first locking means for locking said transition ramping means in said elevated position, said first locking means comprising a first rod extending longitudinally across said transition ramp rear end, said first rod being rotatable about the longitudinal axis thereof; a locking tab means attached to said rod, said locking tab means being adapted to overlap corresponding portions of said transition ramp supporting means when said first rod is in a locked position and said transition ramping means is in said elevated position;
   (e) said transition ramping means is pivotable between said elevated position and a sloping position;
   (f) said first locking means is also adapted to lock said transition ramp in said sloping position by overlapping said locking tab means with portions of said transition ramping means when said first locking means is in said lock position and said transition ramping means is in said sloping position; and
   (g) said transition ramp supporting means comprises a tailer bed tapered tail end fixedly connected to and extending rearwardly from said bed rear end and a stanchion means pivotally attached near said transition ramp rear end, said stanchion means being pivotable between a first position in which said stanchion means is basically parallel with said transition ramping means and a second position in which said stanchion extends between said transition ramp rear end and a rear end of said trailer tapered tail end to support said transition ramping means in said elevated configuration.

2. The vehicle according to claim 1, wherein:
   (a) said locking tab means comprise a plurality of said locking tabs and there are a plurality of said corresponding portions; and
   (b) said plurality of corresponding portions are located on said stanchion means.

3. The vehicle according to claim 2 (a) said transition ramping means comprises means for engaging at least some of said locking tabs when said transition ramping means is in said sloping position and said first rod is in said lock position.

4. The vehicle according to claim 2, wherein: (a) said first locking means includes a first handle means connected to said first rod such that said first rod can be rotated between said lock position and a release position by rotating said first handle means.

5. The vehicle according to claim 4, and further comprising: (a) a handle retaining means for retaining said handle and said first rod in said lock position.

6. The vehicle according to claim 1, wherein: (a) said first rod is flexible.

7. The vehicle according claim 1, wherein
   (a) said tail ramping means is pivotable between a travel position in which it overlies and meshes with said transition ramping means and a loading position in which it extends from said transition ramp rear end to the ground; and
   (b) said vehicle comprises a second locking means for locking said tail ramping means in said travel position.

8. The vehicle according to claim 7, wherein:
   (a) said second locking means comprises a second rod extending longitudinally across said transition ramp front end, said second rod being rotatable about the longitudinal axis thereof; at least one locking tab means attached to said second rod, said locking tab means adapted to overlap a portion of said loading ramp when said second rod is in a lock position.

9. The vehicle according to claim 8, wherein:
   (a) said second rod is flexible.

10. The vehicle according to claim 9, wherein:
    (a) said second locking means includes a handle means connected to said second rod and said second rod can be rotated between said lock position and a release position by rotating said handle means.

11. The vehicle according to claim 10, and further comprising:
    (a) a handle retaining means for retaining said handle and said second rod in said lock position.

12. The vehicle according to claim 7, including:
    (a) biasing means for biasing said tail ramp rear end upwardly.

13. The vehicle according to claim 12, wherein:
    (a) said second biasing means is a coil-type spring connected to said transition ramping means and to said tail ramping means such that said tail ramp secured end is pivotally biased relative to said transition ramp rear end.

14. The vehicle according to claim 1, including: (a) first biasing means for biasing said transition ramp rear end upwardly to counter the weight of said transition ramping means.

15. The vehicle according to claim 14, wherein: (a) said first biasing means comprises a coil spring connected between said transition ramping means and said trailer.

16. The vehicle according to claim 1, including: (a) bracing means for selectively and releasably bracing said tail ramping means relative to said transition ramping means.

17. The vehicle according to claim 16, wherein: (a) said bracing means has a blocking position for bracing said tail ramping means generally transversely to said transition ramping means and a travel position for meshing said tail ramping means with said transition ramping means.

18. The vehicle according to claim 1, wherein: (a) said transition ramping means includes a plurality of transition ramps in a generally side-by-side relationship; and (b) said tail ramping means includes a plurality of tail ramps in a generally side-by-side relation, each pivotally connected to a different one of said transition ramps.

19. In a vehicle having an elevated flat bed for transporting a load wherein the bed has a bed front end and a bed rear end, the improvement comprising:

(a) transition ramping means for ramping to said flat bed, said transition ramping means having a transition ramp front end, which is pivotally connected to the bed rear end, and a transition ramp rear end, said transition ramping means being pivotable between an elevated position and a sloping position;

(b) tail ramping means for ramping to said transition ramp rear end for loading and unloading the vehicle, said tail ramping means having a tail ramp secured end, which is pivotally connected to said transition ramp rear end, and a tail ramp free end;

(c) transition ramp supporting means for supporting said transition ramping means in said elevated position, said ramp supporting means comprising a trailer bed tapered tail end fixedly connected to and extending rearwardly from said bed rear end and a stanchion means pivotally attached near said transition ramp rear end, said stanchion means being pivotable between a first position in which said stanchion means is basically parallel with said transition ramping means and a second position in which said stanchion extends between said transition ramp rear end and a rear end of said trailer tapered tail end to support said transition ramping means in said elevated configuration; and (d) a first locking means for locking said transition ramping means, said first locking means comprising a first rod extending longitudinally across said transition ramp rear end, said rod being rotatable about the longitudinal axis thereof; locking tab means attached to said rod, said locking tab means being adapted to overlap corresponding portions of said transition ramp supporting means when said first rod is in a lock position and said transition ramping means is in said elevated position, said locking tab means also being adapted to overlap portions of said transition ramping means when said transition ramping means is in said sloping position and said first locking means is in said lock position; said first locking means also including a first handle means connected to said first rod such that said first rod can be rotated between said lock position and a release position by rotating said first handle means and a handle retaining means for retaining said handle and said first rod in said lock position.

20. The vehicle according to claim 19, wherein:

(a) said tail ramping means is pivotable between a travel position in which it overlies and meshes with said transition ramping means and a loading position in which it extends from said transition ramp rear end to the ground; and (b) said vehicle comprises a second locking means for locking said tail ramping means in said travel position, said second locking means comprising a second rod extending longitudinally across said transition ramp front end, said second rod being rotatable about the longitudinal axis thereof; a locking tab means attached to said second rod, said locking tab means adapted to mesh with a portion of said loading ramp when said second rod is in a lock position, said second locking means including a second handle means connected to said second rod such that said second rod can be rotated between said lock position and a release position by rotating said handle means.

21. The vehicle according to claim 19, including:

(a) first biasing means for biasing said transition ramp rear end upwardly to counter the weight of said transition ramping means, said first biasing means comprising a coil spring connected between said transition ramping means and said trailer.

* * * * *